United States Patent
Reczek et al.

(10) Patent No.: US 11,429,801 B1
(45) Date of Patent: Aug. 30, 2022

(54) SYSTEM AND METHOD FOR CARRIER IDENTIFICATION

(71) Applicant: PITT OHIO, Pittsburgh, PA (US)

(72) Inventors: Christina Marie Reczek, Carnegia, PA (US); Scott Walter Greacen, Wexford, PA (US)

(73) Assignee: PITT OHIO, Pittsburgh, PA (US)

( * ) Notice: Subject to any disclaimer, the term of this patent is extended or adjusted under 35 U.S.C. 154(b) by 0 days.

(21) Appl. No.: 17/480,712

(22) Filed: Sep. 21, 2021

(51) Int. Cl.
 G06K 7/10 (2006.01)
 G06K 19/07 (2006.01)
 G06N 20/00 (2019.01)

(52) U.S. Cl.
 CPC ..... *G06K 7/10366* (2013.01); *G06K 7/10297* (2013.01); *G06K 19/0723* (2013.01); *G06N 20/00* (2019.01)

(58) Field of Classification Search
 CPC ............ G06K 7/00; G06K 7/08; G06K 7/081; G06K 7/10366
 USPC .......................... 235/451, 439, 435, 375, 487
 See application file for complete search history.

(56) References Cited

U.S. PATENT DOCUMENTS

| | | | |
|---|---|---|---|
| 7,765,120 B2 | 7/2010 | Yadappanavar et al. | |
| 8,572,001 B2 | 10/2013 | Hollis | |
| 2013/0036385 A1* | 2/2013 | Camillieri | G06F 3/0482 715/821 |
| 2014/0149321 A1 | 5/2014 | Laumanns et al. | |
| 2016/0300186 A1 | 10/2016 | Scharaswak et al. | |
| 2018/0315018 A1* | 11/2018 | Nazarian | G06Q 10/08355 |
| 2019/0102874 A1* | 4/2019 | Goja | G06N 20/00 |
| 2019/0213500 A1 | 7/2019 | Chowdhary et al. | |
| 2019/0370735 A1* | 12/2019 | Dyk | G06Q 10/087 |
| 2020/0357089 A1 | 11/2020 | Mohr et al. | |
| 2021/0073734 A1 | 3/2021 | Aman et al. | |
| 2021/0133655 A1 | 5/2021 | Suemitsu et al. | |

FOREIGN PATENT DOCUMENTS

WO 2014178055 11/2014

OTHER PUBLICATIONS

Allen, J., Bektas, T., Cherrett, T., Friday, A., Mcleod, F., Piecyk, M., Piotrowska, M. and Zaltz Austwick, M., Enabling the freight traffic controller for collaborative multi-drop urban logistics: practical and theoretical challenges, Dec. 31, 2017.

* cited by examiner

*Primary Examiner* — Edwyn Labaze
(74) *Attorney, Agent, or Firm* — Caldwell Intellectual Property Law

(57) ABSTRACT

In an aspect, a system for carrier identification. A system includes a computing device. A computing device is configured to receive an identification signal from a central identification unit coupled to a carrier of a plurality of carriers. A computing device is configured to identify a carrier of the plurality of carriers via an identification signal. A computing device is configured to arrange a plurality of carriers into a group as a function of a carrier group optimization model. A computing device is configured to receive a carrier datum from a central identification unit. A computing device is configured to update a group of a plurality of carriers as a function of a carrier datum.

20 Claims, 8 Drawing Sheets

SYSTEM AND METHOD FOR CARRIER IDENTIFICATION

FIELD OF THE INVENTION

The present invention generally relates to the field of supply chain management. In particular, the present invention relates to a central network system and carrier identification for arranging a plurality of carriers into an optimized group.

BACKGROUND

Modern supply chain systems usually have a plurality of carriers involved in a transportation of a transport component. A plurality of carriers may each have a different tracking and monitoring system for transporting the same transport component. As such, modern supply chain systems are inefficient and slow.

SUMMARY OF THE DISCLOSURE

In an aspect, a system for carrier identification is disclosed. A system includes a computing device. A computing device is configured to receive an identification signal from a central identification unit coupled to a carrier of a plurality of carriers. A computing device is configured to identify a carrier of the plurality of carriers as a function of an identification signal. A computing device is configured to arrange a carrier of a plurality of carriers into a group as a function of a carrier group optimization model. A computing device is configured to receive a carrier datum from a central identification unit. A computing device is configured to update a group of a plurality of carriers as a function of a carrier datum.

In an aspect, a method of carrier identification. A method includes receiving, at a computing device, an identification signal from a central identification unit coupled to a carrier of a plurality of carriers. A method includes identifying as a function of an identification signal a carrier of a plurality of carriers. A method includes arranging a carrier of a plurality of carriers into a group as a function of a carrier group optimization model. A method includes receiving at a computing device a carrier datum from a central identification unit. A method includes updating a group of a plurality of carriers as a function of a carrier datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
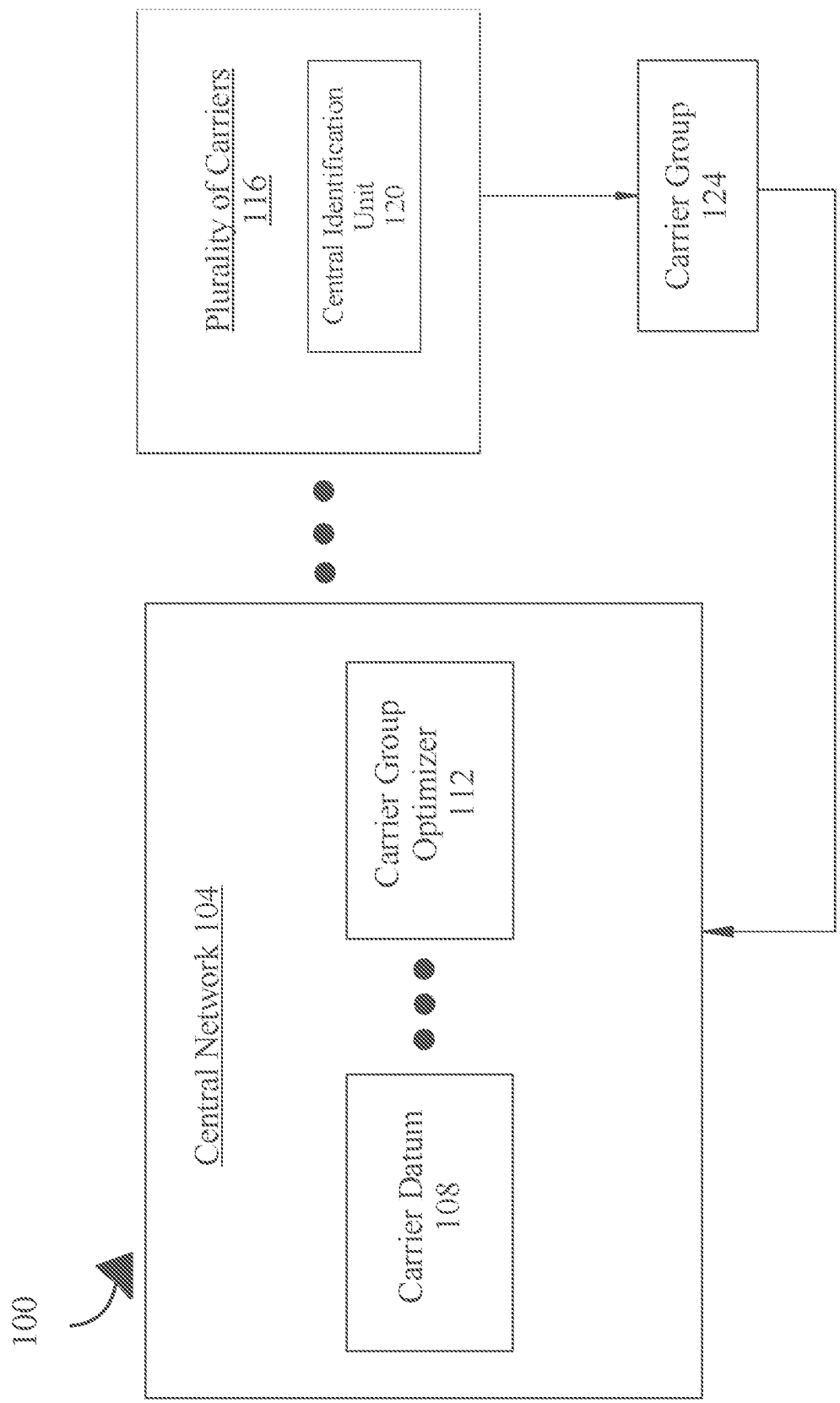
FIG. 1 is a block diagram of a system for carrier identification.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a system for carrier identification. A system may include a computing device. A computing device may be configured to receive an identification signal from a central identification unit coupled to a carrier of a plurality of carriers. A computing device may be configured to identify a carrier of the plurality of carriers as a function of an identification signal. A computing device may be configured to arrange a carrier of a plurality of carriers into a group as a function of a carrier group optimization model. In some embodiments, a carrier group optimization model may be configured to compute a grouping score of the plurality of carriers as a function of an optimization criteria. In some embodiments, a carrier optimization model may include a ranking system. A ranking system may be configured to compare at least a group of a plurality of carriers to another group of a plurality of carriers based on an optimization criteria. In some embodiments, a carrier group optimization model may utilize a machine learning model. In some embodiments, a group of a plurality of carriers may be arranged by a transport component. A computing device may be configured to receive a carrier datum from a central identification unit. A computing device may be configured to update a group of a plurality of carriers as a function of a carrier datum. In some embodiments, a plurality of carriers may be updated based on a grouping threshold. In some embodiments, a grouping of a plurality of carriers may be updated as a function of another grouping of a plurality of carriers.

Described herein is a method of carrier identification. A method may include receiving, at a computing device, an identification signal from a central identification unit coupled to a carrier of a plurality of carriers. A method may include identifying as a function of an identification signal a carrier of a plurality of carriers. A method may include arranging a carrier of a plurality of carriers into a group as a function of a carrier group optimization model. In some embodiments, arranging a plurality of carriers may include computing a grouping score of a plurality of carriers as a function of an optimization criteria. In some embodiments, arranging a plurality of carriers may include a ranking system. A ranking system may be configured to compare at least a group of a plurality of carriers to another group of a plurality of carriers based on an optimization criteria. In some embodiments, arranging a plurality of carriers may include utilizing a machine learning model. In some embodiments, arranging a plurality of carriers may include arranging a group of carriers by a grouping threshold. A method may include receiving at a computing device a carrier datum from a central identification unit. A method may include updating a group of a plurality of carriers as a function of a carrier datum.

Referring now to FIG. 1, a system 100 for carrier identification is presented. System 100 may include computing device 104. Computing device 104 may be utilized for connecting a computing device to one or more of a variety of networks, and one or more devices. Computing device 104 may include, but is not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. Computing device 104 may employ a wired and/or a wireless mode of communication. In general, any network topology may be used. Information (e.g., data, software etc.) may be communicated to and/or from a computer and/or a computing device through computing device 104. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

With continued reference to FIG. 1, computing device 104 may include a computing device that may be designed and/or configured to perform any method, method step, or sequence of method steps in any embodiment described in this disclosure, in any order and with any degree of repetition. For instance, a computing device of computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device of computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may receive carrier datum 108. "Carrier datum" as used in this disclosure is any information pertaining to one or more carriers. Carrier datum 108 may include a plurality of data of plurality of carriers 116. A "carrier" as used in this disclosure is an entity that transports an object between locations. An entity may include, but is not limited to, an individual, a vehicle, a group of individuals, a group of vehicles, and the like. Carrier datum 108 may include data regarding a carrier type. A carrier type may include, but is not limited to, a terrestrial carrier, an aerial carrier, and/or an aquatic carrier. In some embodiments, a carrier type may include but is not limited to, a plane, a drone, a helicopter, a boat, a ship, a car, a truck, a motorcycle, and the like. In some embodiments, a carrier type may include a motorized carrier. In other embodiments, a carrier type may include a non-motorized carrier. In some embodiments, a non-motorized carrier may include, but is not limited to, a bicycle, a skateboard, a scooter, and the like. In a non-limiting example, carrier datum 108 may include data of a carrier of plurality of carriers 116 showing one carrier may be utilizing a truck while another carrier may be utilizing a boat. In some embodiments, carrier datum 108 may include a transport path of a carrier of plurality of carriers 116. A transport path of a carrier may include a path a carrier may take in the process of transporting a transport component. A transport path may include, but is not limited to, directions, estimated transport times, detour information, street addresses, and the like. In some embodiments, a transport path of a carrier of plurality of carriers 116 may include departure times, arrival times, fueling times, rest times, and the like. In some embodiments, a transport path of a carrier may include geographical coordinates, altitudes, longitudes, latitudes, and/or other locational datum. In some embodiments, a transport path may include a latitude, longitude, and/or altitude between two or more carriers. In some embodiments, carrier datum 108 may include a plurality of transport paths of plurality of carriers 116. In some embodiments, carrier datum 108 may include a location of a carrier of plurality of carriers 116. In some embodiments, a location of a carrier of a plurality of carriers 116 may be updated in real time. "Real time" as used in this disclosure is the actual time an action and/or event is occurring. A "transport component" as used in this disclosure is any object that is transported by one or more carriers. A transport component may include dimensions such as, but not limited to, height, length, width, thickness, volume, weight, and the like. In some embodiments, a transport component may belong to a transport component category. A transport component category may include categories such as, but not limited to, food, construction materials, electronics, consumer goods, vehicles, vehicle parts, furniture, and/or other categories. In some embodiments, a transport component may include a value. In some embodiments, carrier datum 108 may include an estimated delivery cost of transporting a transport component. An estimated delivery cost may include a cost of transportation of a transport component. In some embodiments, an estimated delivery cost may include a combined cost of a delivery and transportation of a transport component. In some embodiments, carrier datum 108 may include a location of a transport component. Carrier datum 108 may include data showing which carrier of plurality of carriers 116 is in possession of a transport component.

Still referring to FIG. 1, in some embodiments one or more carriers of plurality of carriers 116 may include central identification unit 120. A "central identification unit" as used in this disclosure is any physical device that comprises a unified digital tag which remains identical between groups of carriers. In some embodiments, central identification unit 120 may include a passive identification such as but not limited to a quick response (QR) code. A "QR" code as used in this disclosure is a type of matrix barcode with a machine-readable optical label that contains information about the item to which it is attached. A QR code may include black squares arranged in a square grid on a white background which may be read by an imaging device. A QR code may be configured to be processed using Reed-Solomon error correction. In other embodiments, central identification unit 120 may include a power source, computing device, and/or transmitting circuitry, and/or receiving circuitry. In some embodiments, a power source may include a battery cell. In some embodiments, central identification unit 120 may include a radio frequency identification (RFID) tag. An RFID tag may be configured to utilize electromagnetic fields to automatically identify and track objects. In some embodiments, an RFID system may include a radio transponder, radio receiver, and/or radio transmitter. In some embodiments, an RFID system may include a passive system. A passive RFID system may include an RFID tag that may be powered by energy from an RFID readers electromagnetic waves. In other embodiments, an RFID tag may be actively powered by a power source such as a battery. In other embodiments, central identification unit 120 may include a near field communication (NFC) tag. An NFC tag may include an antenna that may be configured to inductively couple with another antenna. Inductive coupling may include a configuration in which a change in current through one conductor wire induces a voltage across another conductive wire and vice versa. In some embodiments, an NFC system may be configured to communicate data between two electronic components within a distance of 4 cm or less. In some embodiments, an NFC system may be configured to communicate data between two electronic components over a distance of greater than 4 cm. In some embodiments, an NFC system may include a plurality of modes, such as but not limited to, card emulation, reader/write, and/or peer-to peer modes. In other embodiments, central identification unit 120 may include a unique identification number (UID). A UID may be configured to prevent any duplicate identity records of an entity. In some embodiments, central identification unit 120 may include a digital object identifier (DOI). A DOI may include a persistent identifier and/or handle used to identify objects uniquely, standardized by the International Organization for Standardization. Central identification unit 120 may include utilize a hash function. In some embodiments, central identification unit 120 may include a form of security utilizing an immutable sequence listing. An immutable sequence listing may be described in further detail below with respect to FIG. 5.

Still referring to FIG. 1, central identification unit 120 may be configured to communicate with computing device 104. In some embodiments, central identification unit 120 may be configured to directly communicate with computing device 104 through a cellular, GPS, and/or Wi-Fi connection. In some embodiments, system 100 may include a plurality of central identification units. In some embodiments, a central identification unit of a first carrier of plurality of carriers 116 may be configured to communicate with a central identification unit of a second carrier of plurality of carriers 116. In some embodiments, a central identification unit allocated in a first carrier of plurality of carriers 116 may communicate to a second central identification unit located in a second carrier of plurality of carriers 116 through a Wi-Fi, Bluetooth, or other wireless connection. In some embodiments, a plurality of central identification units may be configured to communicate with computing device 104. In other embodiments, central identification unit 120 may communicate with nearby computing devices that may be configured to forward any data from central identification unit 120 to computing device 104. In some embodiments, central identification unit 120 may be configured to communicate with a computing device of a carrier of plurality of carriers 116. In some embodiments, a communication between central identification unit 120 and a computing device of a carrier of plurality of carriers 116 may include a background connection. A "background connection" as used herein, is a form of connection that may require no action from a carrier to establish a communication between central identification unit 120 and a computing device of the carrier. In some embodiments, central identification unit 120 may include a foreground connection. A "foreground connection" as used herein, is a form of connection that may require an action from a carrier of plurality of carriers 116 to establish a connection between a computing device of the carrier and central identification unit 120. In some embodiments, a background connection may include central identification unit 120 passively connecting to the Internet of Things ("IoT"). The "Internet of Things" as used throughout this disclosure describes a network of physical objects embedded with sensors, software, and/or other technologies for connecting and exchanging data with other device and systems over the internet. A passive connection to the Internet of Things may include central identification unit 120 receiving transmission from other computing devices without actively searching for those computing devices. In some embodiments, central identification unit 120 may actively connect to the Internet of Things. Actively connecting to the Internet of Things may include central identification unit 120 sending search signals to locate other computing devices. In some embodiments, central identification unit 120 may transmit search signals in timed intervals. In some embodiments, a plurality of computing devices may be configured to connect to central identification unit 120. In a non-limiting example, a plurality of Bluetooth and/or Wi-Fi-enabled beacons may be configured to connect to central identification unit 120. A plurality of beacons may include small computing devices that may be placed at key locations in a transport path. In a non-limiting example, a beacon may be placed in a transportation unit of a carrier. In another non-limiting example, a beacon may be placed at a checkpoint location of a transport path. A checkpoint location may include a location along a transport path that may require verification from central identification unit 120. A checkpoint location may include a handoff location. A handoff location may include a location where one carrier of plurality of carriers 116 transfers a transport component to another carrier of plurality of carriers 116. In some embodiments, a plurality of beacons may be placed in a plurality of transportation units, such as, but not limited to, cars, trucks, ships, boats, motorcycles, planes, drones, bicycles, and the like. In other embodiments, central identification unit 120 may be configured to connect to already existing computing devices, such as but not limited to, smartphones, laptops, desktops, tablets, and the like. In some embodiments, the Internet of Things may include already existing computing devices without the need for beacon placement. In some embodiments, a foreground connection may include scanning a QR code. In some embodiments, a foreground connection may include connecting central identification unit 120 to a computing device of a carrier of plurality of carriers 116 through a Bluetooth connection. In some embodiments, a foreground connection may include connecting central identification unit 120 to a computing device of a carrier of plurality of carriers 116 through a Wi-Fi connection. In some embodiments, a carrier of plurality of carriers 116 may generate a foreground connection between central identification unit 120 and a carrier computing device. A carrier computing device may be configured to interact with an application, web browser, and the like. Interaction of an application and/or web browser may include interacting with a GUI of a carrier computing device. In some embodiments, an application and/or web browser may be configured to share data between central identification unit 120 and a carrier computing device. In some embodiments, an application and/or web browser may be configured to communicate data to computing device 104.

Still referring to FIG. 1, computing device 104 may include carrier group optimizer 112. Carrier group optimizer 112 may include an optimization model. An optimization model may include an optimization criterion. An optimization criterion may include any description of a desired value or range of values for one or more attributes of a carrier group; desired value or range of values may include a maximal or minimal value, a range between maximal or minimal values, or an instruction to maximize or minimize an attribute. As a non-limiting example, an optimization criterion may specify that a carrier group should complete a transport as quickly as possible, for instance minimizing the transport time; an optimization criterion may cap a transport time, for instance specifying that it must be completed before a certain date or time, or within a certain period of time. An optimization criterion may alternatively request that transport time be greater than a certain value. An optimization criterion may specify one or more tolerances for precision in transport. An optimization criterion may specify one or more desired cost attributes for the transport. In an embodiment, at least an optimization criterion may assign weights to different attributes or values associated with attributes; weights, as used herein, may be multipliers or other scalar numbers reflecting a relative importance of a particular attribute or value. One or more weights may be expressions of value to a supplier of a particular outcome, attribute value, or other facet of a transportation process; value may be expressed, as a non-limiting example, in remunerative form, such as a quantity of a medium of exchange, a monetary unit, or the like. As a non-limiting example, minimization of transport time may be multiplied by a first weight, while tolerance above a certain value may be multiplied by a second weight. Optimization criteria may be combined in weighted or unweighted combinations into a function reflecting an overall outcome desired by a user; function may be a cost function to be minimized and/or maximized. Function may be defined by reference to transport constraints and/or weighted aggregation thereof as provided by a plurality of remote computing devices; for instance, a cost function combining optimization criteria may seek to minimize or maximize a function of transportation constraints.

Still referring to FIG. 1, computing device 104 may use carrier group optimizer 112 to compare a first group of carriers to a second group of carriers. Generation of carrier group optimizer 112 may include generation of a function to score and weight factors to achieve a process score for each feasible pairing. In some embodiments, pairings may be scored in a matrix for optimization, where columns represent transport components and rows represent carriers potentially paired therewith; each cell of such a matrix may represent a score of a pairing of the corresponding transport component to the corresponding carrier. In some embodiments, assigning a predicted process that optimizes the objective function includes performing a greedy algorithm process. A "greedy algorithm" is defined as an algorithm that selects locally optimal choices, which may or may not generate a globally optimal solution. For instance, carrier group optimizer 112 may select pairings so that scores associated therewith are the best score for each transport and/or for each transport component. In such an example, optimization may determine the combination of carriers such that each object pairing includes the highest score possible.

Still referring to FIG. 1, carrier group optimizer 112 may be formulated as a linear objective function. Carrier group optimizer 112 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all transport components r, S is a set of all carriers s, $c_{rs}$ is a score of a pairing of a given transport component with a given carrier, and $x_{rs}$ is 1 if a transport component r is paired with a carrier s, and 0 otherwise. Continuing the example, constraints may specify that each transport component is assigned to only one carrier, and each carrier is assigned only one transport component. Transport components may include transport components as described above. Sets of transport components may be optimized for a maximum score combination of all generated carrier groups. In various embodiments, carrier group optimizer 112 may determine a combination of transport components that maximizes a total score subject to a constraint that all transport components are paired to exactly one carrier group. Not all carrier groups may receive a transport component pairing since each carrier group may only transport one transport component. A mathematical solver may be implemented to solve for the set of feasible pairings that maximizes the sum of scores across all pairings; mathematical solver may be implemented on computing device 104 and/or another device in system 100, and/or may be implemented on third-party solver.

With continued reference to FIG. 1, carrier group optimizer 112 may include minimizing a loss function, where a "loss function" is an expression an output of which an optimization model minimizes to generate an optimal result. As a non-limiting example, carrier group optimizer 112 may assign variables relating to a set of parameters, which may correspond to score transport components as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Objectives represented in an objective function and/or loss function may include minimization of transportation times. Objectives may include minimization of costs of transporting a transport component. Objectives may include minimization of carriers and/or resources used. Objectives may include minimization of a difference between a selected transport path and an actual transport path taken. Objectives may include minimization of carrier cost.

Still referring to FIG. 1, computing device 104 may utilize carrier group optimizer 112 to arrange plurality of carriers 116 into carrier group 124. Carrier group 124 may be arranged by a plurality of factors including, but not limited to, transport type, transport distance, cost, transport component, and the like. In a non-limiting example, carrier group 124 may include an arrangement of carriers where each carrier may be transporting the same transport component. In another non-limiting example, carrier group 124 may include an arrangement of carriers where each carrier may include a cheapest cost. In another non-limiting example, carrier group 124 may include an arrangement of carriers in which each carrier may follow similar or the same transport paths. In some embodiments, carrier group 124 may be monitored and/or tracked by computing device 104. Monitoring may include, but is not limited to, tracking a location, tracking a transport status, tracking a transport component being transported by a carrier, and the like. Computing device 104 may monitor carrier group 124 through central identification unit 120. Computing device 104 may monitor carrier group 124 through one or more carrier devices. In a non-limiting example, In some embodiments, computing device 104 may synchronize one or more carrier devices to carrier group 124. Synchronizing carrier devices to carrier group 124 may include displaying carrier group data to each carrier in carrier group 124. Carrier group data may include, but is not limited to, carrier identities, quantity of carriers, transport type, transport units, transport destination, transport component data, and the like.

Still referring to FIG. 1, central identification unit 120 may be configured to connect to computing device 104 through computing devices of carriers of carrier group 124. Data received from carrier group 124 may be used by computing device 104 to update carrier datum 108. In some embodiments, computing device 104 may update carrier datum 108 based on carrier group optimizer 112. In some embodiments, carrier group optimizer 112 may be updated based on carrier datum 108. In a non-limiting example, central identification unit 120 may communicate data of a location of a carrier of carrier group 124 in transport. Computing device 104 may update a locational data of carrier datum 108 based on a locational data of carrier group 124. In another non-limiting example, carrier datum 108 may include data of a priority of transportation of a transport component. Computing device 104 may update carrier datum 108 to change routes, quantity of carriers, type of carriers, and estimated cost of transport of a transport component. Carrier datum 108 may communicate updated data to carrier group optimizer 112. Carrier group optimizer 112 may update carrier group 124 based on data from carrier datum 108. In some embodiments, carrier datum 108 may include data of a location of a carrier of carrier group 124 that may be known to be in possession of a transport component. In some embodiments, in an event of miscommunication between central identification unit 120 and computing device 104, computing device 104 may use carrier datum 108 to update a location data of a carrier in carrier group 124. In some embodiments, central identification unit 120 may communicate to computing device 104 that a carrier of carrier group 124 may be unable to complete a transport path. Computing device 104 may update carrier datum 108 to change a carrier, update a discrepancy in transportation cost, a transportation route, and/or remittance of a carrier. Computing device 104 may update carrier group 124 to accommodate a change of carrier datum 108 such as, but not limited to, an estimated transportation time and/or an estimated cost of transportation. Computing device 104 may utilize a machine learning process to identify and predict transport routes, transport costs, transport times, alternative transport routes, carrier types, transport component types, carrier groups, and the like. In some embodiments, computing device 104 may utilize a machine learning process to rank a grouping of plurality of carriers 116. Computing device 104 may be configured to arrange carrier group 124 based on a ranking of the plurality of carriers 116. Computing device 104 may rank a group of plurality of carriers 116 based on, but not limited to, cost, carrier type, transport component type, transport times, and the like. In a non-limiting example, computing device 104 may rank carrier groups using a ranking system of values ranging from 1 to 10, with the least favorable grouping receiving a value of 10, and the most favorable grouping receiving a value of 1. Computing device 104 may assign a carrier group a rank of "6" based on factors such as, but not limited to, carrier costs, transport type, resources used, and the like. The second carrier group may require less handoffs, may have a quicker delivery time, and/or have other advantageous qualities over the first carrier group. Computing device 104 may assign a second carrier group a rank of "2", which may place the second carrier group above the first carrier group in the ranking system. In some embodiments, computing device 104 may arrange carrier group 124 based on a grouping threshold. A "grouping threshold" as used in this disclosure is any maximum or minimum value of a variable of a carrier group. Computing device 104 may arrange a carrier group that may reach a grouping threshold. In some embodiments, computing device 104 may rearrange a carrier group based if the carrier group reaches a grouping threshold value. Computing device 104 may repeat any grouping process to arrange a carrier group until a grouping threshold is not reached. In some embodiments, a grouping threshold may include a maximum or minimum cost. In a non-limiting example, computing device 104 may arrange carrier group 124 under a constraint that the total cost of transportation should not exceed $8,000. Computing device 104 may initially arrange carrier group 124 based on another set of criteria and compare carrier group 124 to the grouping threshold of the total cost of $8,000. Computing device 104 may rearrange carrier group 124 if the total cost exceeds $8,000 until the total cost does not exceed $8,000. In some embodiments, a grouping threshold may include a maximum cost for transporting a transport component. In some embodiments, a grouping threshold may include a minimum cost of carrier remittance. In some embodiments, a grouping threshold may include a quantity of carriers. A quantity of carriers may include a maximum number of carriers that may be grouped together. A quantity of carriers may include a minimum number of carriers that may be grouped together. In some embodiments, a grouping threshold may include a ration of carriers to a transport component. A ration of carriers to a transport component may include a number of carriers per transport component. In some embodiments, a grouping threshold may include a quantity of carrier handoffs. A quantity of carrier handoffs may include a number of times a transport component may be transferred between two or more carriers. In some embodiments, computing device 104 may be configured to receive transport data from carrier group 124 and/or central identification unit 120. "Transport data" as used in this disclosure, is any information about a transport component, carrier, and/or central identification unit.

Figure 2:
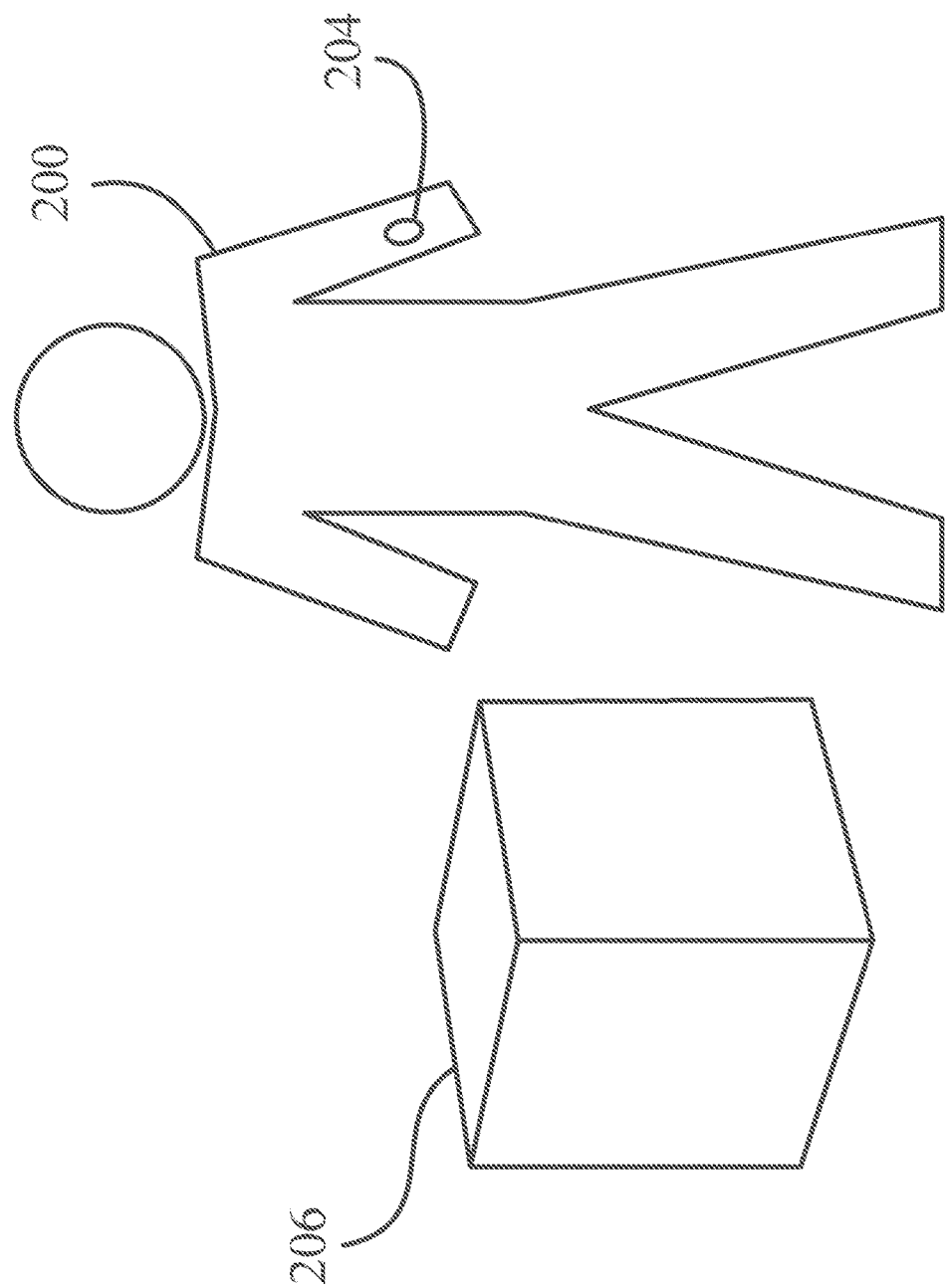
FIG. 2 is an illustration of an exemplary embodiment of a carrier with a central identification unit.

Referring now to FIG. 2, a carrier 200 is illustrated. Carrier 200 may include any person capable of transporting transport component 206. In some embodiments, carrier 200 may include a transport vehicle. A "transport vehicle" as used in this disclosure is any device capable of moving any object or objects between destinations through any medium such as air, land, and sea. In some embodiments, a transport vehicle may include, but is not limited to, a truck, a van, a car, a bike, a scooter, a helicopter, a plane, a drone, a bus, and the like. In some embodiments, transport component 206 may be of a certain shape. A shape may include a rectangular, square, circular, hexagonal, triangular, spherical, conical, and/or other shape. In some embodiments, transport component 206 may be configured to hold a plurality of items. In some embodiments, transport component 206 may include, but is not limited to, construction materials, any consumer goods, clothes, tires, vehicles, vehicle parts, electronics, books, food, and the like. In some embodiments, transport component 206 may include a plurality of objects. In a non-limiting example, transport component 206 may include a plurality of wood planks. In another non-limiting example, transport component 206 may include a plurality of nails, nuts, bolts, and the like. In some embodiments, transport component 206 may include an exterior surface. An exterior surface may include a rigid material that may provide physical protection to transport component 206. In some embodiments, an exterior surface may include grasping elements configured to aid in a transport of transport component 206. Grasping elements may include, but are not limited to, indentations, holes, hooks, magnets, and the like. In some embodiments, an exterior surface may enclose transport component 206. In some embodiments, an exterior surface may include a securing mechanism. A securing mechanism may include a mechanical securing mechanism. A mechanical securing mechanism may include, but is not limited to, stapling, tape, locks, zippers, adhesives, and the like. In some embodiments, transport component 206 may include an exterior surface that may include a height, width, length, and the like. In some embodiments, transport component 206 may include a weight. A weight may be measured in pounds (lbs), kilograms (kg), grams (g), ounces (oz), and the like. In some embodiments, transport component 206 may include a volume. A volume may include a measure of three-dimensional space occupied by matter and/or enclosed by a surface. A volume may be measured in cubic units, such as cubic meters ($m^3$).

Still referring to FIG. 2, carrier 200 may be in possession of central identification unit 204. In some embodiments, central identification unit 204 may be integrated into an object possessed by carrier 200. In some embodiments, central identification unit 204 may be integrated into a clothing of carrier 200. In some embodiments, central identification unit 204 may be integrated into a computing device of carrier 200, such as but not limited to, a smartphone. In some embodiments, central identification unit 204 may include a QR sticker. A QR sticker may be placed on a side of a surface of an object of carrier 200. In other embodiments, central identification unit 204 may include an NFC chip. An NFC chip may be integrated into an exterior surface of an object of carrier 200. In other embodiments, central identification unit 204 may include an RFID and/or Bluetooth chip which may be integrated into a side of an object of carrier 200.

Figure 3:
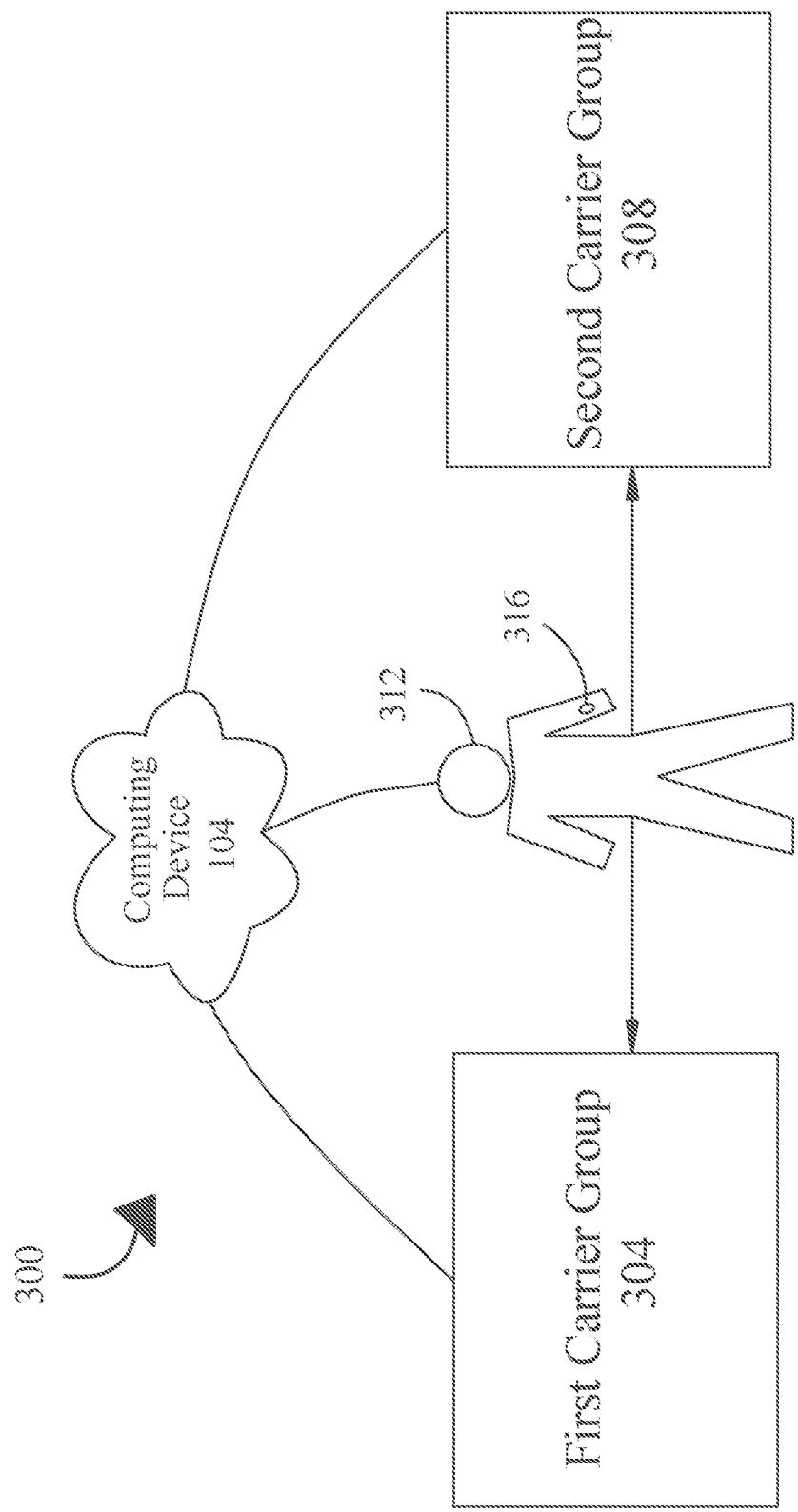
FIG. 3 is a block diagram of a carrier grouping.

Now referring to FIG. 3, an exemplary embodiment of a carrier grouping 300 is shown. Carrier grouping 300 may include first carrier group 304. First carrier group 304 may include one or more carriers 312 arranged by one or more criteria. In a non-limiting example, first carrier group 304 may include carriers assigned to a transport of a specific transport component or transport component group. In another non-limiting example, first carrier group 304 may include carriers having an aquatic transport type. In some embodiments, first carrier group 304 may include a plurality of carriers having a plurality of transport types. First carrier group 304 may include a plurality of carriers assigned at different checkpoints in a transport path. In a non-limiting example, a carrier of first carrier group 304 may pick up a transport component and follow a transport path to a second carrier of first carrier group 304. A second carrier of first carrier group 304 may receive a transport component from a carrier of first carrier group 304 and continue along a transport path. In some embodiments, first carrier group 304 may include a plurality of carriers in possession of a plurality of central identification units 316. A plurality of central identification units 316 of first carrier group 304 may communicate data of one or more carriers, transport components, transport paths, and the like to computing device 104.

Still referring to FIG. 3, carrier grouping 300 may include second carrier group 308. Second carrier group 308 may include one or more carriers 312 arranged by one or more criteria. In a non-limiting example, second carrier group 308 may include carriers assigned to a transport of a specific transport component or transport component group. In another non-limiting example, second carrier group 308 may include carriers having an aquatic transport type. In some embodiments, second carrier group 308 may include a plurality of carriers having a plurality of transport types such as, but not limited to, air, water, sea, and the like. Second carrier group 308 may include a plurality of carriers assigned at different checkpoints in a transport path. In a non-limiting example, a carrier of second carrier group 308 may pick up a transport component and follow a transport path to a second carrier of second carrier group 308. A second carrier of second carrier group 308 may receive a transport component from a carrier of second carrier group 308 and continue along a transport path. In some embodiments, second carrier group 308 may include a plurality of central identification units 316. A plurality of central identification units 316 of second carrier group 308 may communicate data of one or more carriers, transport components, transport paths, and the like to computing device 104.

Still referring to FIG. 3, central identification unit 316 may be configured to communicate with a computing device of first carrier group 304. In some embodiments, central identification unit 316 may be configured to communicate data about a transport component and/or carrier 312 to computing device 104. Computing device 104 may communicate data about a transport component and carrier 312 to second carrier group 308. In some embodiments, computing device 104 may be configured to communicate data about second carrier group 308 to first carrier group 304. In a non-limiting example, first carrier group 304 may be approaching a handoff point of a transport component to second carrier group 308. Computing device 104 may be configured to send first carrier group 304 locational data about a handoff location. In some embodiments, computing device 104 may be configured to send data of a transport path to first carrier group 304. In some embodiments, computing device 320 may be configured to send data about second carrier group 308 to first carrier group 304. In a non-limiting example, computing device 104 may be configured to send data about an arrival time of first carrier group 304 to second carrier group 308. In some embodiments, computing device 104 may be configured to monitor and update data of first carrier group 304 and/or second carrier group 308 such as, but not limited to, real-time transport routes, transport costs, and/or transport times. Computing device 104 may be configured to allow a real-time updating of data of first carrier group 304 and/or second carrier group 308. A real-time updating of data may include displaying transport data and/or carrier data on a display of a computing device of carrier 312. A computing device of carrier 312 may include a display configured to show data of a transport, carrier information, and the like. In some embodiments, carrier computing devices of first carrier group 304 and/or second carrier group 308 may be configured to be synched through computing device 104. Computing device 104 may synchronize and display data between multiple carrier devices through a smartphone application, web browser, and/or other computing interface. In a non-limiting example, computing device 104 may be configured to update a cost of transportation of a transport component and communicate the update to first carrier group 304. In a non-limiting example, a carrier of first carrier group 304 may deviate from a transport pathway and cause excess costs and times of transport. Computing device 104 may communicate this data to a first carrier group 304 and update location data, transport time data, transport cost data, and the like. In some embodiments, computing device 104 may be configured to dynamically update remittance between carrier groups. Computing device 104 may adjust remittance of first carrier group 304 based on transport time, transport path, and/or other data of carrier 312. In a non-limiting example, carrier 312 of first carrier group 304 may ideally transport a transport component without deviation. Carrier 312 may take a wrong transport path, pick up a wrong transport component, and/or transport a transport component to a wrong destination. In this example, computing device 104 reduces a remittance of first carrier group 304 based on the deviation from an ideal transport plan. Computing device 104 may dynamically update remittance of a plurality of carriers and/or carrier groups based on carrier performance, deviation and the like.

In some embodiments, and still referring to FIG. 3, computing device 104 may be configured to include a remittance approval system. A "remittance approval system" as used in this disclosure is any process of authorizing a payment to one or more entities. A remittance approval system may include obtaining carrier transport discrepancy data of one or more carriers. A remittance approval system may compare discrepancy data of one or more carriers 312 with a carrier datum in a computing device database. Computing device 104 may be configured to classify a discrepancy of a carrier transport. A discrepancy may include, but is not limited to, excess transport times, erroneous transport component pick up, erroneous transport destination, accessorial charges, transport component recipients, and/or excess fees associated with a carrier type. In some embodiments, a remittance approval system may check a discrepancy type and adjust remittance of one or more carriers accordingly. In some embodiments, a remittance approval system may flag a discrepancy in computing device 104. In some embodiments, a remittance approval system may flag a discrepancy type for a particular carrier 312 without adjusting remittance of other carriers. A carrier 312 that may be flagged with a discrepancy type may need additional authorization for remittance of a transport. In some embodiments, a remittance approval system may be configured to generate a release flag for remittance of one or more carriers 312. A release flag may approve a remittance for one or more carriers 312 in computing device 104.

Still referring to FIG. 3, in some embodiments computing device 104 may be configured to validate and/or verify a point in a transport plan of a transport component. First carrier group 304 may be required to transport a transport component to a destination. Central identification unit 316 of carrier 312 may be configured to verify a location data of carrier 312 and/or first carrier group 304. In some embodiments, verification includes central identification unit 316 communicating a secure location token to computing device 104. In some embodiments, a verification process may be used at certain locations of a transport path. Locations include, but are not limited to, initial pickup, carrier transfer, and/or destination arrival. A verification process may include computing device 104 determining if data communicated from central identification unit 316 meets a criteria of a point in a transport plan of a transport component. Criteria may include, but is not limited to, a specific destination, a specific carrier, a specific checkpoint, and the like. In some embodiments, central identification unit 316 may be configured to verify each step of a transport process with computing device 104. In some embodiments, if a step of a transport has not been verified, computing device 104 may prevent further steps of the transport until the first step is verified. In some embodiments, computing device 104 may send alerts, notifications, or other communications to one or more carriers 312 that a step has not been verified. In some embodiments, remittance of one or more carriers 312 may be adjusted based on a failed verification step of a transport. Verification of a step may include, but is not limited to, bringing a transport component to a location verifiable by central identification unit 316, communication between central identification unit 316 and computing device 104, and/or carrier 312 manually verifying a step has been completed. In some embodiments, computing device 104 may be configured to allow all carriers of first carrier group 304 and/or second carrier group 308 to access all steps of a transport plan. In other embodiments, computing device 104 may only allow carrier 312 to access their own steps in a transport for verification. Computing device 104 may be configured to send push notifications to a computing device of carrier 312. In a non-limiting example, computing device 104 may be configured to send push notifications to a computing device of carrier 312 notifying carrier 312 that a second carrier is approaching. In another non-limiting example, computing device 104 may be configured to send push notifications to a computing device of carrier 312 to adjust transport paths based on a time-sensitive transportation.

Figure 4:
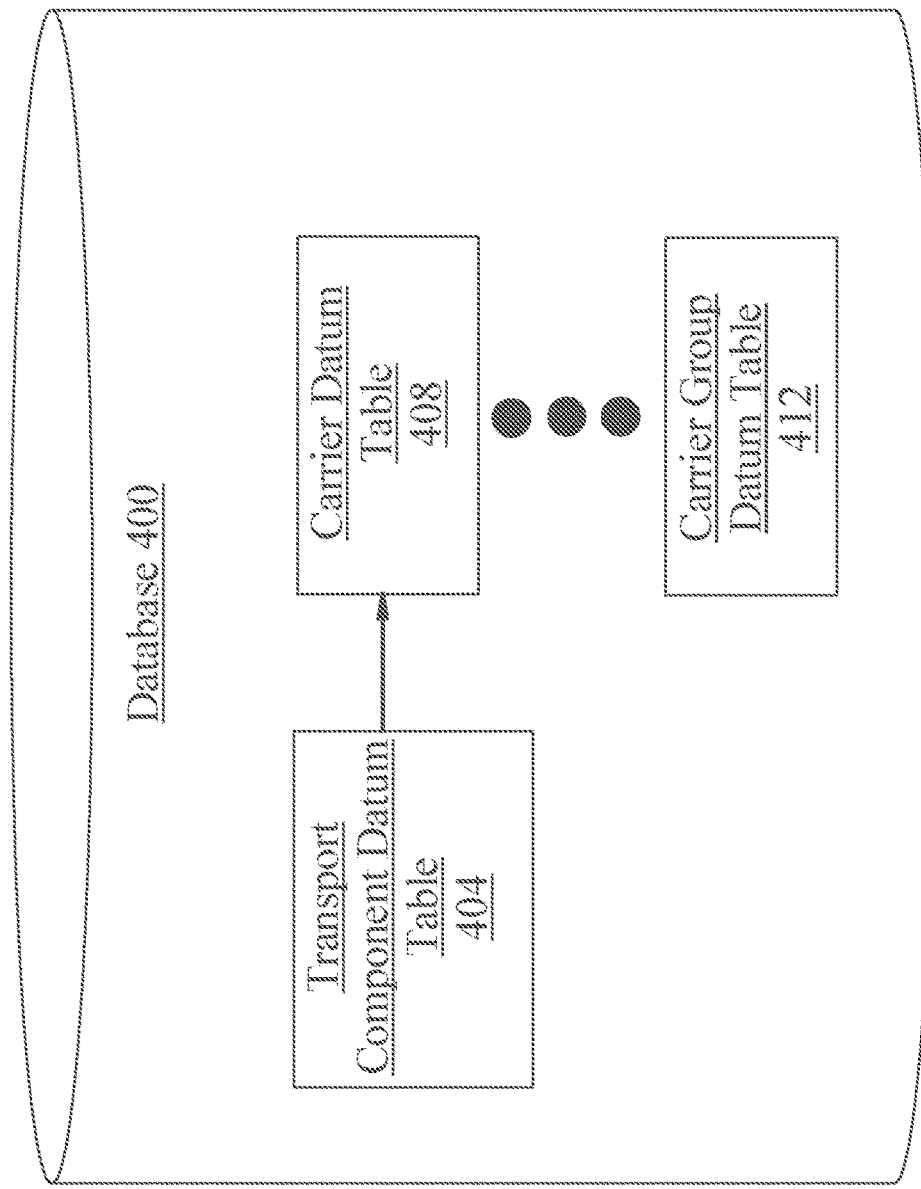
FIG. 4 is a block diagram of an exemplary embodiment of a carrier network database.

Now referring to FIG. 4, an exemplary embodiment of a computing device database 400 is shown. Determinations by a machine-learning process, machine-learning model, ranking function, and/or classifier, may also be stored and/or retrieved from computing device database 400. As a non-limiting example, computing device database 400 may organize data according to one or more instruction tables. One or more tables may be linked to one another by, for instance in a non-limiting example, common column values. For instance, a common column between two tables may include an identifier of a submission, such as a form entry, textual submission, accessory device tokens, local access addresses, metrics, and the like, for instance as defined herein; as a result, a search by a computing device may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables. One or more tables may include, without limitation, a heuristic table, which may organize rankings, scores, models, outcomes, functions, numerical values, scales, arrays, matrices, and the like, that represent determinations, probabilities, metrics, parameters, values, standards, indexes, and the like, include one or more inputs describing potential mathematical relationships, as described herein.

Still referring to FIG. 4, computing device database 400 may include one or more transport component datum table 404. Transport component datum table 404 may include data of a transport component. Data of a transport component may include, but is not limited to, transport component type, transport component height, transport component length, transport component width, transport component value, transport component weight, transport component location, and the like. In some embodiments, transport component datum 404 may include a real-time location of a transport component. Transport component datum 404 may be configured to share data with carrier datum table 408. Computing device database 400 may include one or more carrier datum table 408. Carrier datum table 408 may include data of a carrier including, but not limited to, carrier type, carrier location, carrier remittance, carrier transport path, carrier transport unit type, estimated transport times, and the like. In some embodiments, carrier datum table 408 may be updated with data from transport component datum table 404. In a non-limiting example, transport component datum table 404 may flag carrier datum table 408 that a transport component may be marked as high priority. Carrier datum table 408 may update a transport path, transport time, carrier remittance, and the like to accommodate a high priority transport component. In some embodiments, carrier datum table 408 may be in communication with carrier group datum table 412. Computing device database 400 may include one or more carrier group datum tables 412. Carrier group datum table 412 may include data such as, but not limited to, group transport assignments, group transport paths, group remittance, quantity of carriers, type of carriers, location, speed, destination, estimated arrival, and the like. In some embodiments, carrier datum table 408 may be updated as a function of carrier group datum table 412. In other embodiments, carrier group datum table 412 may be updated as a function of carrier datum table 408. In some embodiments, carrier datum table 408 may be updated by two or more other carrier datums. Computing device database 400 may be configured to synchronize vital data between carrier datum table 408 and carrier group datum table 412. Vital data may include but is not limited to transport times, transport costs, transport component value, carrier type, carrier transport paths, and/or estimated carrier remittance. In some embodiments, carrier group datum table 412 may include data of a carrier group including, but not limited to, carrier type, carrier location, carrier remittance, carrier transport path, carrier transport unit type, estimated transport times, and the like. Carrier datum table 408 may relay information about a first carrier to carrier group datum table 412. Carrier group datum table 412 may update a carrier remittance, transport path, transport time, and the like based on carrier datum table 408. In a non-limiting example, carrier datum table 408 may relay to carrier group datum 412 that a carrier is delayed in a transport time. Carrier group datum table 412 may update a second carrier transport path, transport time, transport remittance, and the like to accommodate the delayed transport time of the first carrier. Computing device database 400 may include an encryption process to protect data stored in computing device database 400. An encryption process may translate data into another form such that only entities with access to a secure key may access the data. In some embodiments, an encryption process may utilize an immutable sequence listing.

Figure 5:
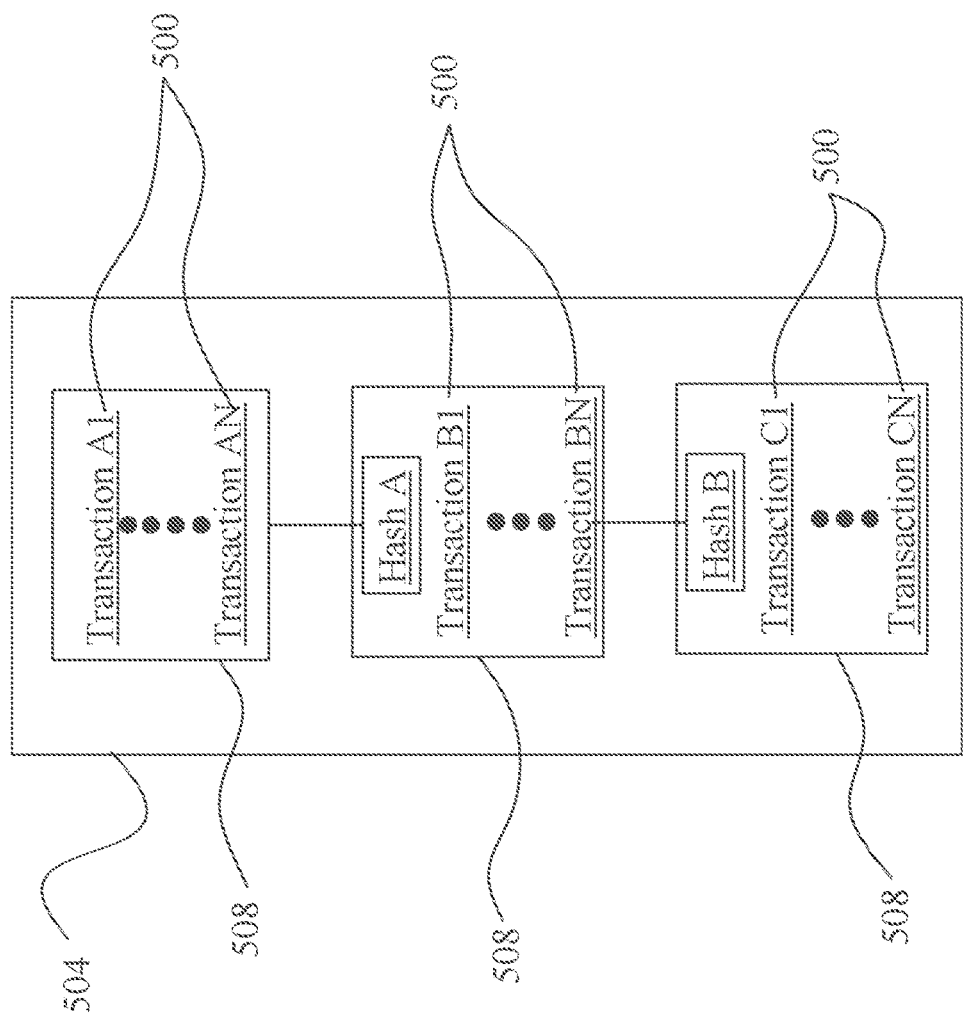
FIG. 5 is a block diagram exemplary embodiment of an immutable sequence listing.

Referring now to FIG. 5, an exemplary embodiment of an immutable sequential listing is shown. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. In some embodiments, an immutable sequential listing may be utilized by a computing device to establish a secure connection between two or more carriers. In some embodiments, an immutable sequential listing may be used by a computing device to secure transport data, carrier data, and/or transport component data. An immutable sequential listing may be used by a computing device to establish a secure link between a central identification unit and the computing device. In some embodiments, a computing device may utilize an immutable sequential listing to generate a plurality of smart contracts. A "smart contract" as used in this disclosure is a self-executing contract with the terms of agreement between a buyer and a seller being directly written into lines of code. A computing device may use smart contracts between a supplier and one or more carriers. A smart contract may be used by a computing device to manage remittance of one or more carriers.

Referring still to FIG. 5, an exemplary embodiment of an immutable sequential listing 500 is illustrated. Data elements are listing in immutable sequential listing 500; data elements may include any form of data, including textual data, image data, encrypted data, cryptographically hashed data, and the like. Data elements may include, without limitation, one or more at least a digitally signed assertions. In one embodiment, a digitally signed assertion 504 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 504. In an embodiment, collection of textual data states that the owner of a certain transferable item represented in a digitally signed assertion 504 register is transferring that item to the owner of an address. A digitally signed assertion 504 may be signed by a digital signature created using the private key associated with the owner's public key, as described above.

Still referring to FIG. 5, a digitally signed assertion 504 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 504 may describe the transfer of a physical good; for instance, a digitally signed assertion 504 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 504 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 5, in one embodiment, an address is a textual datum identifying the recipient of virtual currency or another item of value in a digitally signed assertion 504. In some embodiments, address is linked to a public key, the corresponding private key of which is owned by the recipient of a digitally signed assertion 504. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 504 may record a subsequent a digitally signed assertion 504 transferring some or all of the value transferred in the first a digitally signed assertion 504 to a new address in the same manner. A digitally signed assertion 504 may contain textual information that is not a transfer of some item of value in addition to, or as an alternative to, such a transfer. For instance, as described in further detail below, a digitally signed assertion 504 may indicate a confidence level associated with a distributed storage node as described in further detail below.

In an embodiment, and still referring to FIG. 5 immutable sequential listing 500 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 500 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 5, immutable sequential listing 500 may preserve the order in which the at least a posted content took place by listing them in chronological order; alternatively or additionally, immutable sequential listing 500 may organize digitally signed assertions 504 into sub-listings 508 such as "blocks" in a blockchain, which may be themselves collected in a temporally sequential order; digitally signed assertions 504 within a sub-listing 508 may or may not be temporally sequential. The ledger may preserve the order in which at least a posted content took place by listing them in sub-listings 508 and placing the sub-listings 508 in chronological order. The immutable sequential listing 500 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 500 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 5, immutable sequential listing 500, once formed, may be inalterable by any party, no matter what access rights that party possesses. For instance, immutable sequential listing 500 may include a hash chain, in which data is added during a successive hashing process to ensure non-repudiation. Immutable sequential listing 500 may include a block chain. In one embodiment, a block chain is immutable sequential listing 500 that records one or more new at least a posted content in a data item known as a sub-listing 508 or "block." An example of a block chain is the BITCOIN block chain used to record BITCOIN transactions and values. Sub-listings 508 may be created in a way that places the sub-listings 508 in chronological order and link each sub-listing 508 to a previous sub-listing 508 in the chronological order so that any computing device may traverse the sub-listings 508 in reverse chronological order to verify any at least a posted content listed in the block chain. Each new sub-listing 508 may be required to contain a cryptographic hash describing the previous sub-listing 508. In some embodiments, the block chain contains a single first sub-listing 508 sometimes known as a "genesis block."

Still referring to FIG. 5, the creation of a new sub-listing 508 may be computationally expensive; for instance, the creation of a new sub-listing 508 may be designed by a "proof of work" protocol accepted by all participants in forming the immutable sequential listing 500 to take a powerful set of computing devices a certain period of time to produce. Where one sub-listing 508 takes less time for a given set of computing devices to produce the sub-listing 508 protocol may adjust the algorithm to produce the next sub-listing 508 so that it will require more steps; where one sub-listing 508 takes more time for a given set of computing devices to produce the sub-listing 508 protocol may adjust the algorithm to produce the next sub-listing 508 so that it will require fewer steps. As an example, protocol may require a new sub-listing 508 to contain a cryptographic hash describing its contents; the cryptographic hash may be required to satisfy a mathematical condition, achieved by having the sub-listing 508 contain a number, called a nonce, whose value is determined after the fact by the discovery of the hash that satisfies the mathematical condition. Continuing the example, the protocol may be able to adjust the mathematical condition so that the discovery of the hash describing a sub-listing 508 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 508 according to the protocol is known as "mining." The creation of a new sub-listing 508 may be designed by a "proof of stake" protocol as will be apparent to those skilled in the art upon reviewing the entirety of this disclosure.

Continuing to refer to FIG. 5, in some embodiments, protocol also creates an incentive to mine new sub-listings 508. The incentive may be financial; for instance, successfully mining a new sub-listing 508 may result in the person or entity that mines the sub-listing 508 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 508 Each sub-listing 508 created in immutable sequential listing 500 may contain a record or at least a posted content describing one or more addresses that receive an incentive, such as virtual currency, as the result of successfully mining the sub-listing 508.

With continued reference to FIG. 5, where two entities simultaneously create new sub-listings 508, immutable sequential listing 500 may develop a fork; protocol may determine which of the two alternate branches in the fork is the valid new portion of the immutable sequential listing 500 by evaluating, after a certain amount of time has passed, which branch is longer. "Length" may be measured according to the number of sub-listings 508 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 508 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 500 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 500.

Still referring to FIG. 5, additional data linked to at least a posted content may be incorporated in sub-listings 508 in the immutable sequential listing 500; for instance, data may be incorporated in one or more fields recognized by block chain protocols that permit a person or computer forming a at least a posted content to insert additional data in the immutable sequential listing 500. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 5, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 508 in a block chain computationally challenging; the incentive for producing sub-listings 508 may include the grant of new crypto-currency to the miners. Quantities of crypto-currency may be exchanged using at least a posted content as described above.

Figure 6:
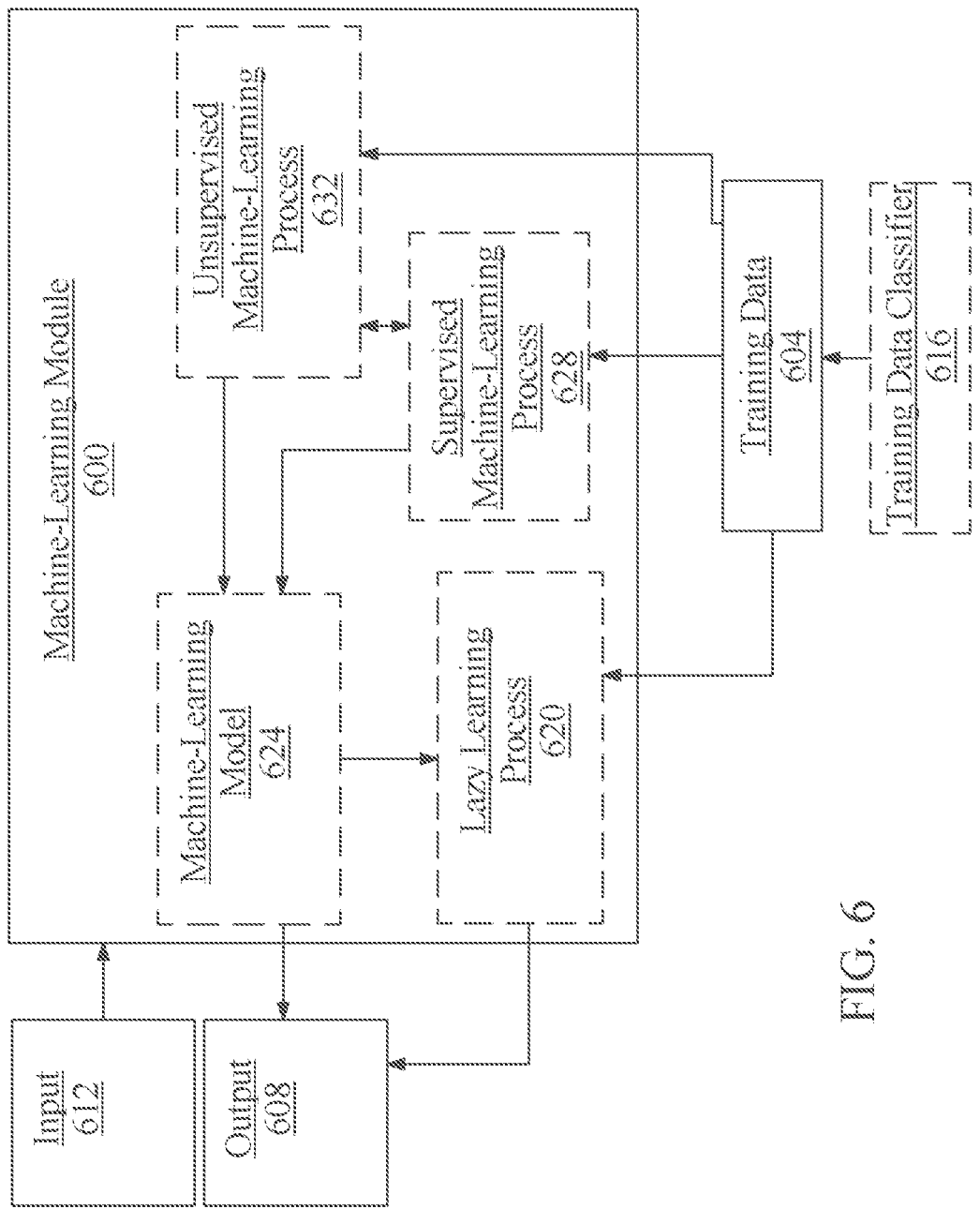
FIG. 6 is a block diagram of a machine learning system.

Referring now to FIG. 6, an exemplary embodiment of a machine-learning module 600 that may perform one or more machine-learning processes as described in this disclosure is illustrated. A computing device may utilize machine-learning module 600 to predict a transport path of a carrier group, carrier group performance, carrier group remittance, and type of carrier based on a transport component category. In some embodiments, a computing device may utilize machine-learning module 600 that may be trained with data from computing device database 400. Machine-learning module 600 may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Training data 604 may be received and/or collected from a computing device database. In other embodiments, training data 604 may be received from a user input. Training data 604 may be received from previous iterations of training data vectors. In some embodiments, training data 604 may be received by one or more remote devices that at least correlate carrier data and transport data. In some embodiments, training data 604 may correlate transport component data and carrier data. In other embodiments, training data 604 may correlate carrier data and remittance data. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example carrier data and/or transport component data may be inputs, wherein an output may be a transport path of a transport component.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or transport component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to sub-categories of transport data such as location, direction, speed, transport times, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include carrier data and/or transport component data as described above as inputs, transport paths as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
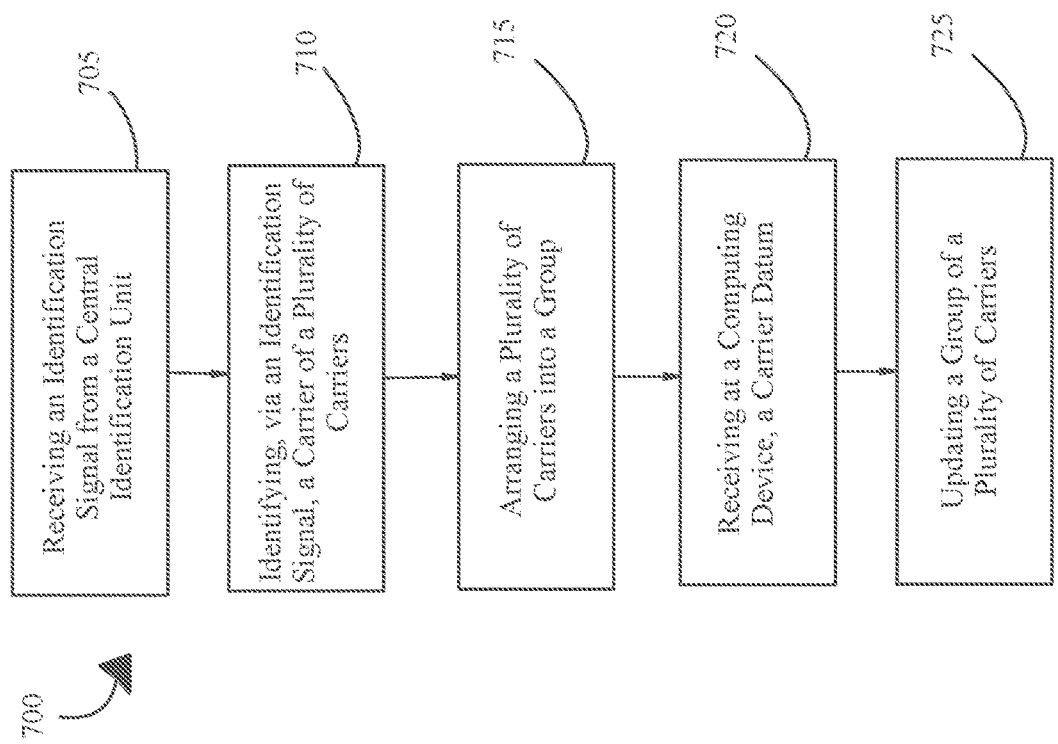
FIG. 7 is a block diagram illustrating an exemplary embodiment of a method of monitoring a transport component.

Now referring to FIG. 7, method 700 for carrier identification is presented. At step 705, method 700 includes receiving an identification signal from a central identification unit. A central identification unit may include an RFID, NFC, or the like. This step may be implemented, without limitation, as described in FIGS. 1-6.

Still referring to FIG. 7, at step 710, method 700 includes identifying via an identification signal a carrier of a plurality of carriers. This step may be implemented, without limitation, as described in FIGS. 1-6.

Still referring to FIG. 7, at step 715, method 700 includes arranging a plurality of carriers into a group. Arranging a plurality of carriers into a group may include a group optimization model. A group optimization model may include a machine learning model configured to input a plurality of carrier data and output a grouping score of a plurality of carriers. In some embodiments, a group of carriers may be arranged by an optimization criteria. In some embodiments, a group of carriers may be arranged based on a grouping threshold. In some embodiments, a group of carriers may be arranged by a transport component. This step may be implemented, without limitation, as described in FIGS. 1-6.

Still referring to FIG. 7, at step 720, method 700 includes receiving at a computing device a carrier datum. A carrier datum may include any data relating to a carrier such as, but not limited to, location, transport path, type of carrier, type of transport, and the like. This step may be implemented, without limitation, as described in FIGS. 1-6.

Still referring to FIG. 7, at step 725, method 700 includes updating a group of a plurality of carriers. In some embodiments, a group of a plurality of carriers may be updated based on carrier and/or transport data. In some embodiments, updating a group of a plurality of carriers may include a central network. A central network may be configured to communicate data between multiple carriers. This step may be implemented, without limitation, as described in FIGS. 1-6.

Figure 8:
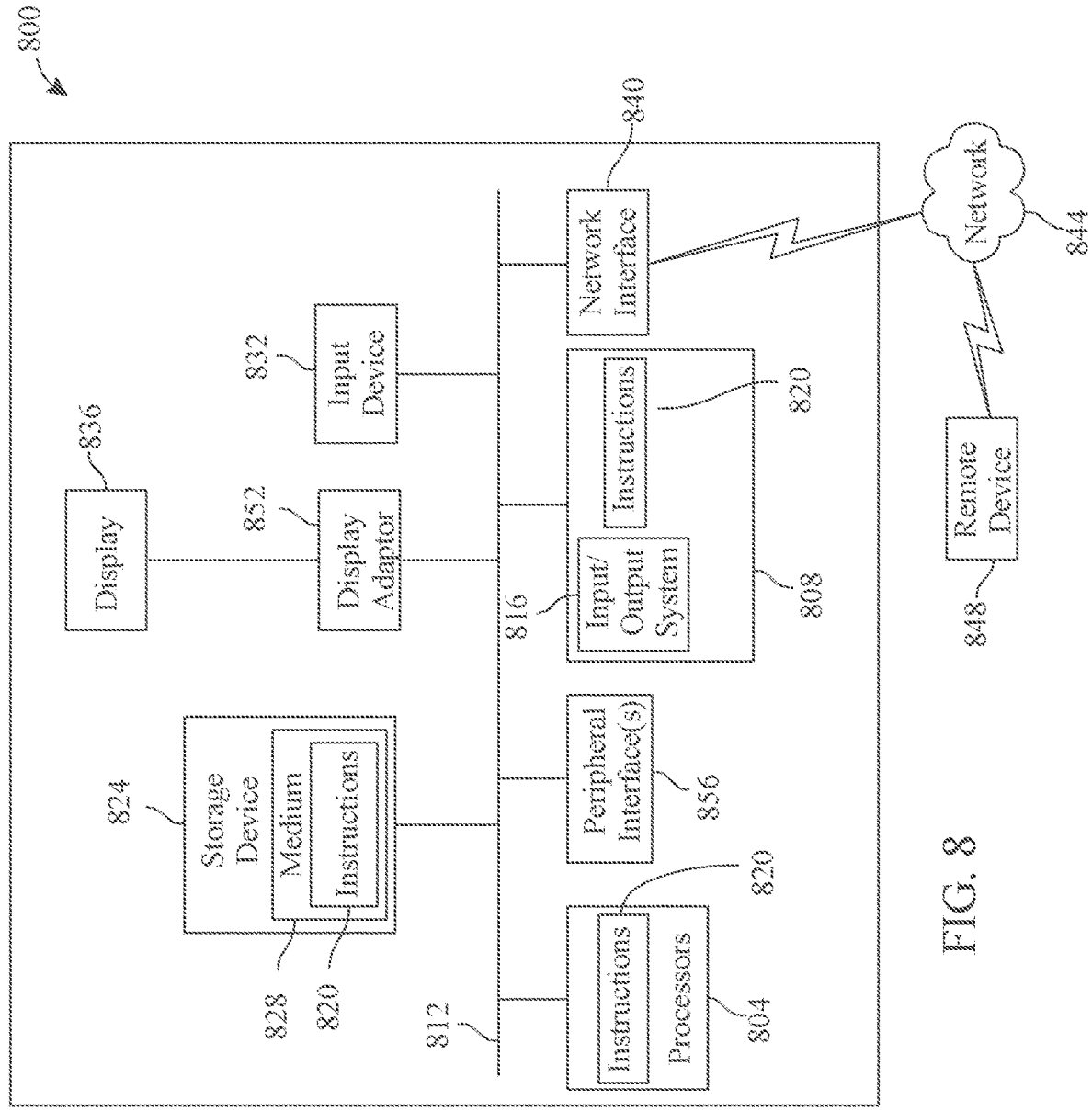
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for carrier identification, comprising:
   a computing device, configured to:
   receive an identification signal from a central identification unit in communication with a carrier of a plurality of carriers;
   identify the carrier of the plurality of carriers as a function of the identification signal;
   arrange the carrier of the plurality of carriers into a group as a function of a carrier group optimization model;
   receive a carrier datum from the central identification unit;
   verify the carrier datum as a function of a criterion of a transport plan; and
   update a group of the plurality of carriers as a function of the verification of the carrier datum.

2. The system of claim 1, wherein arranging the plurality of carriers into a group further comprises computing a grouping score of the plurality of carriers as a function of an optimization criteria.

3. The system of claim 1, wherein the carrier group optimization model includes a ranking system, wherein the ranking system compares at least a group of the plurality of carriers to a second group of the plurality of carriers based on an optimization criteria.

4. The system of claim 1, wherein the carrier group optimization model is further configured to:
   receive training data, wherein the training data comprises a plurality of carrier data correlated to a grouping score;
   train a machine learning model with the training data; and
   order, as a function of the machine learning model, the plurality of carriers by a grouping score, wherein the machine learning model is configured to input a plurality of carrier data and output, as a function of the plurality of carrier data, a grouping score of the plurality of carriers.

5. The system of claim 1, wherein a grouping of a plurality of carriers is updated based on a grouping threshold.

6. The system of claim 1, wherein the group of the plurality of carriers is arranged by an optimization criteria.

7. The system of claim 1, wherein the group of the plurality of carriers is arranged by a transport component.

8. The system of claim 1, wherein the computing device is further configured to update a grouping of a plurality of carriers as a function of another grouping of a plurality of carriers.

9. The system of claim 1, wherein the central identification unit include an RFID component.

10. The system of claim 1, wherein the central identification unit includes an NFC component.

11. A method of carrier identification, comprising:
    receiving, at a computing device, an identification signal from a central identification unit in communication with a carrier of a plurality of carriers;
    identifying, via the identification signal, the carrier of the plurality of carriers;
    arranging the carrier of the plurality of carriers into a group as a function of a carrier group optimization model;
    receiving, at the computing device, a carrier datum from the central identification unit;
    verifying the carrier datum as a function of a criterion of a transport plan; and
    updating a group of the plurality of carriers as a function of the verification of the carrier datum.

12. The method of claim 11, wherein arranging the plurality of carriers into a group further comprises computing a grouping score of the plurality of carriers as a function of an optimization criteria.

13. The method of claim 11, wherein arranging the plurality of carriers into a group as a function of a carrier group optimization model further comprises a ranking system, wherein the ranking system compares at least a group of a plurality of carriers to a second group of the plurality of carriers based on an optimization criteria.

14. The method of claim 11, wherein arranging the plurality of carriers into a group as a function of a carrier group optimization model further comprises:

receiving training data, wherein the training data comprises a plurality of carrier data correlated to a grouping score;

training a machine learning model with the training data; and ordering, as a function of the machine learning model, the plurality of carriers by a grouping score, wherein the machine learning model is configured to input a plurality of carrier data and output, as a function of the plurality of carrier data, a grouping score of the plurality of carriers.

15. The method of claim 11, wherein arranging the plurality of carriers into a group further comprises arranging the group of a plurality of carriers based on a grouping threshold.

16. The method of claim 11, wherein arranging the plurality of carriers into a group further comprises arranging the group by an optimization criteria.

17. The method of claim 11, wherein arranging the plurality of carriers into a group further comprises arranging the group by a transport component.

18. The method of claim 11, further comprising a central network, wherein the central network is configured to communicate a plurality of transport data to the group of carriers.

19. The method of claim 11, wherein the central identification unit include an RFID component.

20. The method of claim 11, wherein the central identification unit includes an NFC component.

\* \* \* \* \*